United States Patent
Chang et al.

(10) Patent No.: US 11,065,846 B2
(45) Date of Patent: Jul. 20, 2021

(54) POLYMER FILM AND USES OF THE SAME

(71) Applicant: Chang Chun Petrochemical Co., Ltd., Taipei (TW)

(72) Inventors: Chin-Yen Chang, Taipei (TW); Cheng-Fan Wang, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/789,257

(22) Filed: Feb. 12, 2020

(65) Prior Publication Data
US 2021/0162717 A1   Jun. 3, 2021

(30) Foreign Application Priority Data

Nov. 29, 2019  (CN) .......................... 201911201298.1
Nov. 29, 2019  (TW) ................................. 108143712

(51) Int. Cl.
*B32B 17/06* (2006.01)
*B32B 17/10* (2006.01)
*B32B 27/30* (2006.01)

(52) U.S. Cl.
CPC .. *B32B 17/10761* (2013.01); *B32B 17/10036* (2013.01); *B32B 2307/538* (2013.01); *B32B 2307/732* (2013.01)

(58) Field of Classification Search
CPC ........ B32B 17/10761; B32B 17/10036; B32B 17/10165; B32B 2307/538; B32B 2307/732; B32B 27/30
See application file for complete search history.

(56) References Cited

U.S. PATENT DOCUMENTS

| | | | |
|---|---|---|---|
| 3,926,918 A * | 12/1975 | Shibata ..................... | C08F 8/28 525/61 |
| 7,883,761 B2 * | 2/2011 | Bourcier ........... | B32B 17/10587 428/141 |
| 2018/0029335 A1 | 2/2018 | Kong et al. | |
| 2018/0319133 A1 | 11/2018 | Nakajima et al. | |
| 2018/0361714 A1 * | 12/2018 | Kim .................. | B32B 17/10577 |
| 2019/0152208 A1 | 5/2019 | Steuer et al. | |
| 2019/0156811 A1 | 5/2019 | Wang et al. | |
| 2019/0232624 A1 | 8/2019 | Lu | |

FOREIGN PATENT DOCUMENTS

| | | |
|---|---|---|
| CN | 107662387 A | 2/2018 |
| CN | 108290783 A | 7/2018 |
| JP | 2001-220183 A | 8/2001 |
| TW | 201932308 A | 8/2019 |

* cited by examiner

*Primary Examiner* — Joanna Pleszczynska
(74) *Attorney, Agent, or Firm* — Christensen, Fonder, Dardi & Herbert PLLC

(57) ABSTRACT

A polymer film comprising polyvinyl acetal and a laminated glass manufactured using the same are provided. The polymer film has a 45-100° C. dimensional variability ranging from 20 μm to 50 μm, and at least one surface of the polymer film has a surface roughness Rz ranging from 30 μm to 55 μm.

19 Claims, No Drawings

POLYMER FILM AND USES OF THE SAME

CLAIM FOR PRIORITY

This application claims the benefit of Taiwan Patent Application No. 108143712 filed on Nov. 29, 2019 and China Patent Application No. 201911201298.1 filed on Nov. 29, 2019, the subject matters of which are incorporated herein in their entirety by reference.

BACKGROUND OF THE INVENTION

Field of the Invention

The present invention provides a polymer film, especially a polymer film with specific dimensional variability and surface roughness. The polymer film is suitable for use as an interlayer of a laminated glass.

Descriptions of the Related Art

A laminated glass is a glass material with a composite structure formed by interposing a polymer film between two glass sheets and performing hot-pressing to bond the glass sheets and the polymer film together. Since laminated glasses have superior impact resistance and acoustic insulation property, they are widely used in the automobile and building industries.

Since the manufacturing process of laminated glass involves the hot-pressing of glass sheets and polymer film, it is important to avoid leaving air between the glass sheets and polymer film of the laminated glass to improve yield. A known approach of removing air between the glass sheets and polymer film of laminated glass is to provide a texture design on the surface of the polymer film to facilitate de-airing during hot-pressing. However, the de-airing performance of existing polymer films is still insufficient to provide satisfactory yield of laminated glass. Although the de-airing performance can be further improved by increasing the fluidity of polymer film, such an approach usually results in edge-delamination (i.e., separation of polymer film and the glass sheet at the edge of the laminated glass).

SUMMARY OF THE INVENTION

The present invention aims to provide a polymer film, specifically a polymer film with a specific dimensional variability and a specific surface roughness. The polymer film is especially suitable for use as an interlayer of a laminated glass. The laminated glass that is manufactured using this polymer film shows an excellent or good result with the bubbling test and has no edge-delamination defects.

Therefore, an objective of the present invention is to provide a polymer film, which comprises polyvinyl acetal, wherein:
  the polymer film has a 45-100° C. dimensional variability ranging from 20 μm to 50 μm; and
  at least one surface of the polymer film has a surface roughness Rz ranging from 30 μm to 55 μm.

In some embodiments of the present invention, each of the two surfaces of the polymer film independently has a surface roughness Rz ranging from 30 μm to 55 μm.

In some embodiments of the present invention, the polyvinyl acetal is selected from the group consisting of poly(vinyl formal), poly(vinyl acetal), poly(vinyl butyral), poly(vinyl pentanal), poly(vinyl hexanal), and combinations thereof.

In some embodiments of the present invention, the polyvinyl acetal has a hydroxyl content ranging from 13 wt % to 25 wt %, wherein the hydroxyl content is measured in accordance with JIS 6728.

In some embodiments of the present invention, the polyvinyl acetal included in the polymer film has a weight average molecular weight (Mw) ranging from 150,000 daltons to 250,000 daltons.

In some embodiments of the present invention, the polyvinyl acetal included in the polymer film comprises 10 mol % to 20 mol % of polyvinyl acetal with a molecular weight lower than 50,000 daltons.

In some embodiments of the present invention, the polyvinyl acetal included in the polymer film comprises 1 mol % to 10 mol % of polyvinyl acetal with a molecular weight higher than 800,000 daltons.

In some embodiments of the present invention, the polymer film further comprises a plasticizer. The amount of the plasticizer ranges from 30 parts by weight to 60 parts by weight per 100 parts by weight of polyvinyl acetal.

In some embodiments of the present invention, the polymer film has a thickness ranging from 0.5 mm to 1.5 mm.

In some embodiments of the present invention, the polymer film is a multilayer film.

In some embodiments of the present invention, the polymer further comprises an additive selected from the group consisting of dyes, pigments, stabilizers, anti-oxidants, flame retardants, infrared absorbers, infrared blocking agents, ultraviolet absorbers, ultraviolet stabilizers, lubricants, dispersing agents, surfactants, chelating agents, coupling agents, binders, adhesion controlling agents, and combinations thereof.

Another objective of the present invention is to provide a laminated glass, which comprises a first glass sheet, a second glass sheet, and the aforementioned polymer film disposed between the first glass sheet and the second glass sheet.

To render the above objectives, technical features and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENTS

Hereinafter, some embodiments of the present invention will be described in detail. However, without departing from the spirit of the present invention, the present invention may be embodied in various embodiments and should not be limited to the embodiments described in the specification.

Unless it is additionally explained, the expressions "a," "the," or the like recited in the specification and the claims should include both the singular and the plural forms.

Unless it is additionally explained, the expressions "first," "second," or the like recited in the specification and the claims are merely used to distinguish the illustrated elements or constituents without special meanings. Those expressions are not intended to indicate any priority.

Unless it is additionally explained, the term "dimensional variability" recited in the specification and the claims means a thickness variation of a polymer film between two designated temperatures which is measured under specific measurement conditions. For example, a 45-100° C. dimensional variability means a thickness variation of a polymer film between 45° C. and 100° C. The specific measurement conditions are described in the "Examples" section below.

Unless it is additionally explained, the term "surface roughness Rz" recited in the specification and the claims means a ten-point mean roughness of a surface and is measured in accordance with JIS B 0601 (1994).

The present invention provides a polymer film and a laminated glass manufactured using the same, wherein the polymer film has a specific dimensional variability and a specific surface roughness Rz. The laminated glass shows an excellent or good result with the bubbling test and has no edge-delamination defects. The polymer film of the present invention and the applications thereof are described in detail below.

1. POLYMER FILM 1.1. Constitution of Polymer Film

The polymer film of the present invention comprises polyvinyl acetal as an essential constituent and may further comprise other optional constituents, such as a plasticizer or other conventional additives, depending on the needs. In some embodiments of the present invention, the polymer film comprises or consists of polyvinyl acetal and a plasticizer.

Examples of polyvinyl acetal include but are not limited to poly(vinyl formal), poly(vinyl acetal), poly(vinyl butyral), poly(vinyl pentanal), and poly(vinyl hexanal). The above-mentioned polyvinyl acetal can either be used alone or in a mixture of two or more. In the appended examples, poly(vinyl butyral) is used.

As mentioned herein, a plasticizer, also called a plasticizing agent, is a chemical substance that can modify the plasticity of a thermoplastic resin. Examples of the plasticizer includes but are not limited to esters of polybasic acids or polyhydric alcohols, such as triethylene glycol bis(2-ethylhexanoate), tetraethylene glycol bis(2-ethylhexanoate), triethylene glycol bis(2-ethylbutyrate), tetraethylene glycol bis(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, bis[2-(2-butoxyethoxy)ethyl] adipate, polymeric adipates, dipropylene glycol dibenzoate, tripropylene glycol dibenzoate, polypropylene glycol dibenzoate, isodecyl benzoate, 2-ethylhexyl benzoate, propylene glycol dibenzoate, diisononyl phthalate, dibutoxyethyl terephthalate, castor oil, methyl ricinoleate, soybean oils, epoxidized soybean oils, and combinations thereof.

Conventional additives can be any substance that can adaptively improve the workability of the polymer film during its manufacturing process or impart specific functions to the polymer film. Examples of conventional additives include but are not limited to dyes, pigments, stabilizers, anti-oxidants, flame retardants, infrared absorbers, infrared blocking agents, ultraviolet absorbers, ultraviolet stabilizers, lubricants, dispersing agents, surfactants, chelating agents, coupling agents, binders, and adhesion controlling agents. The above-mentioned additives can be used alone or in a combination thereof. For example, the polymer film can comprise a dye or pigment to form a colored polymer film. The polymer film can also comprise an ultraviolet absorber or infrared absorber to form a polymer film with anti-ultraviolet function or a polymer film with anti-infrared function.

The thickness of the polymer film of the present invention can be adjusted depending on the practical needs as long as the polymer film has the designated 45-100° C. dimensional variability and surface roughness Rz. In general, the thickness of the polymer film can range from 0.5 mm to 1.5 mm, such as 0.51 mm, 0.52 mm, 0.53 mm, 0.54 mm, 0.55 mm, 0.56 mm, 0.57 mm, 0.58 mm, 0.59 mm, 0.6 mm, 0.61 mm, 0.62 mm, 0.63 mm, 0.64 mm, 0.65 mm, 0.66 mm, 0.67 mm, 0.68 mm, 0.69 mm, 0.7 mm, 0.71 mm, 0.72 mm, 0.73 mm, 0.74 mm, 0.75 mm, 0.76 mm, 0.77 mm, 0.78 mm, 0.79 mm, 0.8 mm, 0.81 mm, 0.82 mm, 0.83 mm, 0.84 mm, 0.85 mm, 0.86 mm, 0.87 mm, 0.88 mm, 0.89 mm, 0.9 mm, 0.91 mm, 0.92 mm, 0.93 mm, 0.94 mm, 0.95 mm, 0.96 mm, 0.97 mm, 0.98 mm, 0.99 mm, 1.0 mm, 1.01 mm, 1.02 mm, 1.03 mm, 1.04 mm, 1.05 mm, 1.06 mm, 1.07 mm, 1.08 mm, 1.09 mm, 1.1 mm, 1.11 mm, 1.12 mm, 1.13 mm, 1.14 mm, 1.15 mm, 1.16 mm, 1.17 mm, 1.18 mm, 1.19 mm, 1.2 mm, 1.21 mm, 1.22 mm, 1.23 mm, 1.24 mm, 1.25 mm, 1.26 mm, 1.27 mm, 1.28 mm, 1.29 mm, 1.3 mm, 1.31 mm, 1.32 mm, 1.33 mm, 1.34 mm, 1.35 mm, 1.36 mm, 1.37 mm, 1.38 mm, 1.39 mm, 1.4 mm, 1.41 mm, 1.42 mm, 1.43 mm, 1.44 mm, 1.45 mm, 1.46 mm, 1.47 mm, 1.48 mm, or 1.49 mm, but the present invention is not limited thereto.

The polymer film of the present invention may be a single-layer film composed of one single layer or a multilayer film composed of multiple layers, as long as the polymer film as a whole has the designated 45-100° C. dimensional variability and surface roughness Rz. When the polymer film is a multilayer film, the layers of the polymer film can be made of identical or different materials and thus can be identical or different function layers. The above-mentioned functional layer may be, for example, a layer with one or more of the following functions: acoustic insulation function, thermal insulation function, reflection function, anti-reflection function, refraction function, anti-refraction function, light-splitting function, and dimming function. However, the present invention is not limited thereto.

1.2. Properties of Polymer Film

The present invention provides a laminated glass that shows an excellent or good result with the bubbling test and has no edge-delamination defects by means of controlling the dimensional variability and surface roughness of the polymer film of the laminated glass. Specifically, the polymer film according to the present invention has a 45-100° C. dimensional variability ranging from 20 μm to 50 μm, and at least one surface of the polymer film has a surface roughness Rz ranging from 30 μm to 55 μm. In the preferred embodiments of the present invention, each of the two surfaces of the polymer film independently has a surface roughness Rz ranging from 30 μm to 55 μm. For example, the polymer film may have a 45-100° C. dimensional variability of 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, or 49 μm. The surface of the polymer film may have a surface roughness Rz of 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, 50 μm, 51 μm, 52 μm, 53 μm, or 54 μm.

The inventor surprisingly found that the technical efficacy of the present invention (i.e., providing a laminated glass without bubbles or edge-delamination defects) can be achieved only in the case that the 45-100° C. dimensional variability of the polymer film and the surface roughness Rz of at least one surface of the polymer film are within the above-mentioned designated ranges. The technical efficacy achieved by the present invention is unexpected to persons having ordinary skill in the art. In particular, the hot-pressing temperature for laminated glasses are generally higher than 100° C., such as 120° C., 135° C., 150° C. or a higher temperature. Under these circumstances, persons having ordinary skill in the art can by no means expect that the dimensional variability at the specific temperature interval ranging from 45° C. to 100° C. is critical to the achievement of the technical efficacy of the present invention.

Regarding the 45-100° C. dimensional variability of the polymer film of the present invention, the approaches for adjusting the dimensional variability of the polymer film include but are not limited to: adjusting the viscosity of the polymer used for forming the polymer film, adjusting the hydroxyl content of the polymer, adjusting the molecular weight and molecular weight distribution of the polymer, and adding a plasticizer. For example, one or more of the following approaches can be used to adjust the properties of polyvinyl acetal to obtain the designated dimensional variability:

(i) the polyvinyl acetal may have a viscosity under normal temperature and pressure ranging from 70 cps to 110 cps, such as 71 cps, 72 cps, 73 cps, 74 cps, 75 cps, 76 cps, 77 cps, 78 cps, 79 cps, 80 cps, 81 cps, 82 cps, 83 cps, 84 cps, 85 cps, 86 cps, 87 cps, 88 cps, 89 cps, 90 cps, 91 cps, 92 cps, 93 cps, 94 cps, 95 cps, 96 cps, 97 cps, 98 cps, 99 cps, 100 cps, 101 cps, 102 cps, 103 cps, 104 cps, 105 cps, 106 cps, 107 cps, 108 cps, or 109 cps;

(ii) the polyvinyl acetal may have a hydroxyl content ranging from 13 wt % to 25 wt %, such as 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, 20 wt %, 20.5 wt %, 21 wt %, 21.5 wt %, 22 wt %, 22.5 wt %, 23 wt %, 23.5 wt %, 24 wt %, or 24.5 wt %, wherein the hydroxyl content is measured in accordance with JIS 6728;

(iii) the polyvinyl acetal may have a weight average molecular weight (Mw) ranging from 150,000 daltons to 250,000 daltons, such as 155,000 daltons, 160,000 daltons, 165,000 daltons, 170,000 daltons, 175,000 daltons, 180,000 daltons, 185,000 daltons, 190,000 daltons, 195,000 daltons, 200,000 daltons, 205,000 daltons, 210,000 daltons, 215,000 daltons, 220,000 daltons, 225,000 daltons, 230,000 daltons, 235,000 daltons, 240,000 daltons, or 245,000 daltons;

(iv) in the polyvinyl acetal, the content of polyvinyl acetal with a molecular weight lower than 50,000 daltons may range from 10 mol % to 20 mol %, such as 10.5 mol %, 11 mol %, 11.5 mol %, 12 mol %, 12.5 mol %, 13 mol %, 13.5 mol %, 14 mol %, 14.5 mol %, 15 mol %, 15.5 mol %, 16 mol %, 16.5 mol %, 17 mol %, 17.5 mol %, 18 mol %, 18.5 mol %, 19 mol %, or 19.5 mol %;

(v) in the polyvinyl acetal, the content of polyvinyl acetal with a molecular weight higher than 800,000 daltons may range from 1 nmol % to 10 mol %, such as 1.5 mol %, 2 mol %, 2.5 mol %, 3 mol %, 3.5 mol %, 4 mol %, 4.5 mol %, 5 mol %, 5.5 mol %, 6 mol %, 6.5 mol %, 7 mol %, 7.5 mol %, 8 mol %, 8.5 mol %, 9 mol %, or 9.5 mol %; and (vi) in the polymer film, the amount of the plasticizer may range from 30 parts by weight to 60 parts by weight, such as 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, 50 parts by weight, 51 parts by weight, 52 parts by weight, 53 parts by weight, 54 parts by weight, 55 parts by weight, 56 parts by weight, 57 parts by weight, 58 parts by weight, or 59 parts by weight, per 100 parts by weight of polyvinyl acetal.

The method for providing the desired surface roughness Rz on the surface of the polymer film of the present invention can be any conventional approach. For example, the desired surface roughness Rz can be provided by forming melt fracture textures on the surface of the polymer film by controlling process conditions during the formation of the polymer film. For example, a polymer film with the desired surface roughness Rz can be manufactured by using an extruder by controlling the die lip temperature to range from 180° C. to 200° C., the head inlet pressure to range from 120 bars to 140 bars, the linear velocity to range from 12 m/min to 15 m/min, and the throughput of the extruder to be 1500 kg/hr. Alternatively, the desired surface roughness Rz can be provided on a polymer film by means of a machine embossing method after the polymer film is formed. Machine embossing methods include but are not limited to an embossing roller method or a calendaring roller method. The embossing roller method is preferred. The texture types provided by using machine embossing methods includes but are not limited to rhombus, line shape, sawtooth shape, square, taper shape, circular shape, sub-circular shape, and irregular shape. The above-mentioned texture types can be used alone or in a combination thereof. The machine embossing method can be easily performed by persons having ordinary skill in the art based on the disclosure of the subject specification as well as their general knowledge, and it will only be illustrated in the appended examples.

1.3. Manufacture of Polymer Film

The method for manufacturing the polymer film of the present invention is not particularly limited. For example, the polymer film of the present invention may be manufactured by mixing and kneading polyvinyl acetal and optional constituents (e.g., a plasticizer) to obtain a polymer composition, using the polymer composition to provide a polymer film by means of a conventional method, and optionally performing a machine embossing step to provide the desired surface roughness Rz on the surface of the polymer film. Examples of the conventional method for providing the polymer film include but are not limited to a calendering method, a casting method, an extrusion stretching method, a direct extruding method, and an extrusion blowing method.

In some embodiments of the present invention, the polymer film is manufactured as follows: mixing and kneading a polyvinyl acetal resin and a plasticizer by using a mixer under a temperature ranging from 100° C. to 150° C. and a rotation speed ranging from 10 rpm to 50 rpm for 5 minutes to 30 minutes to obtain a polymer composition; cooling down the polymer composition to room temperature, then placing it in a hot presser and hot-pressing it under a temperature ranging from 100° C. to 200° C. and a pressure ranging from 2 kg to 5 kg for 1 minute to 10 minutes to form a film; optionally repeating the above-mentioned film-forming steps and adjusting the constitution of the polymer composition to provide films with different functions, then laminating the films to form a polymer film with a multilayer structure; and optionally performing a machine embossing step to the polymer film to provide the desired surface roughness Rz.

2. LAMINATED GLASS

The polymer film of the present invention is suitable for use as an interlayer of a laminated glass. Thus, the present invention also provides a laminated glass, which comprises a first glass sheet, a second glass sheet, and the aforementioned polymer film disposed between the first glass sheet and the second glass sheet.

The first glass sheet and the second glass sheet may be identical or different from each other. The first glass sheet and the second glass sheet each can be any conventional glass sheet for manufacturing laminated glasses. The conventional glass sheets for manufacturing laminated glasses include but are not limited to float glasses, tempered glasses, wired glasses, or plain plate glasses. In the appended examples, float glasses are used as the first glass sheet and the second glass sheet.

The laminated glass of the present invention can be manufactured by any method known in the art. In general, a laminated glass can be manufactured as follows: interposing a polymer film between the first glass sheet and second glass sheet to obtain a laminated object; pre-pressing the laminated object to remove the air between the glass sheets and polymer film; and then placing the pre-pressed laminated object into an autoclave under high temperature and pressure for a period of time to obtain a laminated glass. The above-mentioned pre-pressing step can be performed by means of hot-pressing or vacuum-pumping. Vacuum-pumping is generally used in manufacturing non-planar laminated glasses and will be illustrated in the appended examples. Hot-pressing is usually performed by using a hot presser and is mainly used in manufacturing planar-laminated glasses. For example, hot-pressing can be performed as follows: setting the conveying rate of a conveyor belt of a roller presser to 2 m/min to 8 m/min and the temperature of an oven to 150° C. to 200° C.; placing a laminated object on the conveyor belt in such a way that the laminated object is passed through the oven and then passed through between a pair of rollers with a spacing ranging from 5.5 mm to 6.5 mm; and then cooling down the roller-pressed laminated object to room temperature to complete pre-pressing.

3. EXAMPLES

3.1. Testing Methods

The present invention is further illustrated by the embodiments hereinafter, wherein the testing instruments and methods are as follows.

[Measurement of Molecular Weight Distribution of Polyvinyl Acetal]

The molecular weight distribution of polyvinyl acetal is measured by means of gel permeation chromatography (GPC), wherein polyvinyl acetal is dissolved in tetrahydrofuran (THF) and subjected to GPC analysis under the conditions below. The molecular weight of polyvinyl acetal is calculated based on the ratio corresponding to the area of standard polystyrene (Water PS STD).

Device: Waters 1515 PUMP system
Detector: Waters 2414 RI
Elution condition: 1.0 mL/min, THF
Column: Waters Styragel HR5 THF, Waters Styragel HR4 THF, Waters Styragel HR3 THF, Waters Styragel HR1 THF

[Measurement of Viscosity of Polyvinyl Acetal]

The viscosity of polyvinyl acetal is measured in accordance with JIS 6728.

[Measurement of Dimensional Variability]

The polymer film kept in a desiccator is cut into a disc specimen with a diameter of 6 mm. The specimen is interposed between a pair of aluminum plates to obtain a test sample. The test sample is placed into a thermomechanical analyzer (model name: TMA Q400, available from TA Instrument) and tested under the following conditions to obtain dimensional variability: an expansion probe with a diameter of 2.8 mm is used, the applied force is 1.0 N, and the temperature is raised from 25° C. to 145° C. with a heating rate of 10° C./min.

[Analysis of Surface Roughness Rz]

The surface roughness Rz is measured by using a roughness tester (model name: SE 300, available from KOSAKA Laboratory Ltd.) in accordance with JIS B 0601 (1994). First, the polymer film is cut into a test sample of 8 cm×30 cm. The conditions for measuring are set as follows: the vertical magnification is set to automatic, the horizontal magnification is set to 25 mm/$\lambda_c$, the cut off distance is set to 2.5 mm (i.e., calculating once per 2.5 mm), the length of evaluation is seven (7) times the cut off distance, the baseline length is set to 17.5 mm, and the measuring direction is machine direction.

[Bubbling Test and Edge-Delamination Test]

The laminated glass is cut to provide twenty (20) pieces of test samples with a width of 150 mm and a length of 300 mm. The test samples are placed vertically in an environment with a temperature of 50° C. and a relative humidity of 95% for twenty-eight (28) days. Then, the test samples are visually observed to check whether edge-delamination and bubbling are found, wherein the bubbling means there are bubbles which are not in contact with external air between the glass sheet and the polymer film. The criteria of bubbling test is as follows: if there is no test sample with bubbling among twenty (20) pieces of test samples, the result of the bubbling test is excellent and recorded as "⊚"; if there are less than three (3) pieces of test samples with bubbling among twenty (20) pieces of test samples, the result of bubbling test is good and recorded as "○"; if there are three (3) to five (5) pieces of test samples with bubbling among twenty (20) pieces of test samples, the result of bubbling test is poor and recorded as "Δ"; and if there are more than five (5) pieces of test samples with bubbling among twenty (20) pieces of test samples, the result of bubbling test is very bad and recorded as "x". The criteria of edge-delamination test is as follows: if there is no test sample with edge-delamination among twenty (20) pieces of test samples, the result of edge-delamination test is passed and recorded as "⊚"; and if there is one or more test samples with edge-delamination among twenty (20) pieces of test samples, the result of edge-delamination test is failed and recorded as "x".

3.2. List of Raw Materials Used in Examples and Comparative Examples

TABLE 1

| List of raw materials | |
|---|---|
| Model No. or abbreviation of raw material | Description |
| PVB | Poly(vinyl butyral), available from Chang Chun Petrochemical Co., Ltd. |
| 3GO | Plasticizer, triethylene glycol bis(2-ethylhexanoate), |

3.3. Manufacture and Properties of Polymer Film

The polymer film of Examples 1 to 7 and Comparative Examples 1 to 7 were manufactured according to the proportions shown in Tables 2-1 and 2-2, and the manufacturing method is described as follows. First, PVB and 3GO were mixed according to the proportions shown in Tables 2-1 and 2-2 to obtain a mixture. The mixture was kneaded by using a mixer under 120° C. at a rotation speed of 35 rpm for 15 minutes, and then the mixture was cooled to room temperature to obtain a PVB composition. Next, the PVB composition was placed in a hot-presser and subjected to hot-pressing under 150° C. and a pressure of 3 kg for 3 minutes to obtain a polymer film.

Afterwards, the two surfaces of the polymer film were optionally subjected to machine embossing by using an embossing machine to provide the desired surface roughness Rz. The conditions for machine embossing are as follows: the temperature of the embossing roller ranges from 120° C. to 140° C., the pressure of the embossing roller ranges from 4 bars to 8 bars, and the linear velocity of the polymer film passing through the pair of embossing rollers ranges from 9 m/min to 11 m/min.

The molecular weight distribution, hydroxyl content and viscosity of PVB of the polymer films of Examples 1 to 7 and Comparative Examples 1 to 7, as well as the thickness, surface roughness Rz, 45-100° C. dimensional variability and 100-135° C. dimensional variability of the polymer films of Examples 1 to 7 and Comparative Examples 1 to 7 were measured according to the aforementioned testing methods, and the results are listed in Tables 2-1 and 2-2.

TABLE 2-1

Constituents and properties of PVB and polymer film of Examples 1 to 7

| | Unit | Example 1 | 2 | 3 | 4 | 5 | 6 | 7 |
|---|---|---|---|---|---|---|---|---|
| PVB | parts by weight | 100 | 100 | 100 | 100 | 100 | 100 | 100 |
| 3GO | parts by weight | 38.43 | 39.68 | 38.78 | 39.04 | 39.16 | 41.14 | 41.42 |
| Thickness of polymer film | mm | 0.789 | 0.776 | 0.783 | 0.778 | 0.777 | 0.773 | 0.776 |
| Rz of polymer film | μm | 40.1 | 31.2 | 53.5 | 46.2 | 38.4 | 41.1 | 44.5 |
| 45-100° C. dimensional variability of polymer film | μm | 36.20 | 28.76 | 43.21 | 31.00 | 33.63 | 34.12 | 30.69 |
| 100-135° C. dimensional variability of polymer film | μm | 194.10 | 198.40 | 223.30 | 210.40 | 221.20 | 218.10 | 214.80 |
| Viscosity of PVB | cps | 82 | 99 | 77 | 98 | 88 | 92 | 104 |
| Hydroxyl content of PVB | wt % | 19.4 | 19.4 | 18.6 | 19.4 | 18.9 | 18.7 | 19.3 |
| Molecular weight (Mw) of PVB | daltons | 190982 | 207593 | 186573 | 181365 | 185764 | 195723 | 195434 |
| Content of polymer with MW <50,000 in PVB | | 13.7 mol % | 13.5 mol % | 15.7 mol % | 14.4 mol % | 16.2 mol % | 16.5 mol % | 14.3 mol % |
| Content of polymer with MW >800,000 in PVB | | 6.3 mol % | 5.4 mol % | 6.1 mol % | 4.7 mol % | 4.5 mol % | 5.2 mol % | 6.1 mol % |
| Formation method of texture on polymer film | | Machine embossing | Machine embossing | Machine embossing | Machine embossing | Machine embossing | Machine embossing | Machine embossing |

TABLE 2-2

Constituents and properties of PVB and polymer film of Comparative Examples 1 to 7

| | Unit | Comparative Example 1 | 2 | 3 | 4 | 5 | 6 | 7 |
|---|---|---|---|---|---|---|---|---|
| PVB | parts by weight | 100 | 100 | 100 | 100 | 100 | 100 | 100 |
| 3GO | parts by weight | 40.20 | 39.73 | 45.20 | 37.40 | 41.82 | 39.34 | 39.21 |
| Thickness of polymer film | mm | 0.781 | 0.785 | 0.777 | 0.784 | 0.778 | 0.779 | 0.776 |
| Rz of polymer film | μm | 28.00 | 60.20 | 40.10 | 39.43 | 40.20 | 44.21 | 42.30 |
| 45-100° C. dimensional variability of polymer film | μm | 34.35 | 35.44 | 56.32 | 15.32 | 55.00 | 17.43 | 54.20 |
| 100-135° C. dimensional variability of polymer film | μm | 226.20 | 244.21 | 273.20 | 223.23 | 222.40 | 212.19 | 242.19 |
| Viscosity of PVB | cps | 91 | 86 | 75 | 112 | 67 | 113 | 95 |
| Hydroxyl content of PVB | wt % | 18.9 | 18.3 | 17.8 | 20.2 | 18.1 | 19.8 | 19.6 |

TABLE 2-2-continued

Constituents and properties of PVB and polymer film of Comparative Examples 1 to 7

| | Unit | Comparative Example | | | | | | |
|---|---|---|---|---|---|---|---|---|
| | | 1 | 2 | 3 | 4 | 5 | 6 | 7 |
| Molecular weight (Mw) of PVB | daltons | 185698 | 183948 | 194532 | 196437 | 198287 | 190.87 | 182312 |
| Content of polymer with MW <50,000 in PVB | | 15.6 mol % | 16.3 mol % | 17.9 mol % | 13.5 mol % | 17.9 mol % | 13.5 mol % | 19.5 mol % |
| Content of polymer with MW >800,000 in PVB | | 6.5 mol % | 4.7 mol % | 4.5 mol % | 5.6 mol % | 4.4 mol % | 5.8 mol % | 3.2 mol % |
| Formation method of texture on polymer film | | Melt fracture | Melt fracture | Machine embossing | Machine embossing | Machine embossing | Machine embossing | Machine embossing |

3.4. Manufacture and Properties of Laminated Glass

Laminated glasses were manufactured respectively by using the polymer films of Examples 1 to 7 and Comparative Examples 1 to 7. First, two pieces of clean transparent float glass sheets (length: 300 mm; width: 150 mm; thickness: 2 mm to 4 mm) were provided. The polymer films of Examples 1 to 7 and Comparative Examples 1 to 7 were interposed respectively between the two pieces of transparent float glass sheets to obtain a laminated object. The laminated object was placed in an airtight bag and subjected to the creation of vacuum (vacuum degree: >500 mmHg) under a temperature of 20° C. to 30° C. for at least 10 minutes. Next, the airtight bag containing the laminated object was placed into a heating furnace. The temperature of the heating furnace was slowly increased from 60° C. to 130° C. within at least 30 minutes. Then the airtight bag was taken out from the heating furnace to complete pre-pressing. The pre-pressed laminated object was placed in an autoclave, subjected to hot-pressing under a pressure of 13 bars and a temperature of 135° C. for 10 minutes, and then cooled to room temperature to obtain a laminated glass.

The bubbling test and edge-delamination test for the laminated glasses of Examples 1 to 7 and Comparative Examples 1 to 7 were evaluated according to the aforementioned testing methods, and the results are listed in Tables 3-1 and 3-2.

TABLE 3-1

Properties of laminated glasses of Examples 1 to 7

| | Example | | | | | | |
|---|---|---|---|---|---|---|---|
| | 1 | 2 | 3 | 4 | 5 | 6 | 7 |
| Bubbling test | ○ | ◎ | ◎ | ◎ | ◎ | ◎ | Δ |
| Edge-delamination test | ◎ | ◎ | ◎ | ◎ | ◎ | ◎ | ◎ |

TABLE 3-2

Properties of laminated glasses of Comparative Examples 1 to 7

| | Comparative Example | | | | | | |
|---|---|---|---|---|---|---|---|
| | 1 | 2 | 3 | 4 | 5 | 6 | 7 |
| Bubbling test | X | Δ | X | X | X | X | X |
| Edge-delamination test | ◎ | ◎ | X | ◎ | X | ◎ | X |

As shown in Table 3-1, the laminated glass manufactured from the polymer film of the present invention passed the bubbling test and the edge-delamination test, showing an excellent or good result with the bubbling test and having no edge-delamination defects. In particular, as shown in Examples 1 to 7, though the content of plasticizer, hydroxyl content of PVB, molecular weight of PVB, and 100-135° C. dimensional variability are varied, each of the laminated glasses can achieve an excellent or good result with the bubbling test and has no edge-delamination as long as the 45-100° C. dimensional variability and surface roughness Rz of the polymer film are within the designated range.

By contrast, as shown in Table 3-2, the laminated glass manufactured from the polymer film that does not belong to the present invention cannot meet the requirements of showing an excellent or good result with the bubbling test and having no edge-delamination. In particular, as shown in Comparative Examples 1 to 7, regardless of the content of the plasticizer, hydroxyl content of PVB, molecular weight of PVB, and value of 100-135° C. dimensional variability, none of the laminated glass can meet the requirements of showing an excellent or good result with the bubbling test and having no edge-delamination when the 45-100° C. dimensional variability and surface roughness Rz of the polymer film are not within the designated range.

The above examples are used to illustrate the principle and efficacy of the present invention and show the inventive features thereof, but are not used to limit the scope of the present invention. People skilled in this field may proceed with a variety of modifications and replacements based on the disclosures and suggestions of the invention as described without departing from the principle and spirit thereof. Therefore, the scope of protection of the present invention is that as defined in the claims as appended.

What is claimed is:

1. A polymer film, which comprises polyvinyl acetal, wherein:
    the polymer film has a 45-100° C. dimensional variability ranging from 20 μm to 50 μm; and
    at least one surface of the polymer film has a surface roughness Rz ranging from 30 μm to 55 μm,
    wherein the 45-100° C. dimensional variability is a thickness variation of the polymer film between 45° C. and 100° C.,
    wherein the polyvinyl acetal has a viscosity ranging from 70 cps to 110 cps,
    wherein the polyvinyl acetal comprises 11 mol % to 20 mol % of polyvinyl acetal with a molecular weight lower than 50,000 daltons.

2. The polymer film of claim 1, wherein the polymer film has a 45-100° C. dimensional variability ranging from 28 μm to 44 μm, and at least one surface of the polymer film has a surface roughness Rz ranging from 31 μm to 54 μm.

3. The polymer film of claim 1, wherein each of the two surfaces of the polymer film independently has a surface roughness Rz ranging from 30 μm to 55 μm.

4. The polymer film of claim 1, wherein the polyvinyl acetal is selected from the group consisting of poly(vinyl formal), poly(vinyl acetal), poly(vinyl butyral), poly(vinyl pentanal), poly(vinyl hexanal), and combinations thereof.

5. The polymer film of claim 1, wherein the polyvinyl acetal has a hydroxyl content ranging from 13 wt % to 25 wt %.

6. The polymer film of claim 1, wherein polyvinyl acetal has a weight average molecular weight (Mw) ranging from 150,000 daltons to 250,000 daltons.

7. The polymer film of claim 1, wherein the polyvinyl acetal comprises 1 mol % to 10 mol % of polyvinyl acetal with a molecular weight higher than 800,000 daltons.

8. The polymer film of claim 1, which further comprises a plasticizer.

9. The polymer film of claim 2, which further comprises a plasticizer.

10. The polymer film of claim 8, wherein the amount of the plasticizer ranges from 30 parts by weight to 60 parts by weight per 100 parts by weight of polyvinyl acetal.

11. The polymer film of claim 9, wherein the amount of the plasticizer ranges from 30 parts by weight to 60 parts by weight per 100 parts by weight of polyvinyl acetal.

12. The polymer film of claim 1, which has a thickness ranging from 0.5 mm to 1.5 mm.

13. The polymer film of claim 2, which has a thickness ranging from 0.5 mm to 1.5 mm.

14. The polymer film of claim 1, which is a multilayer film.

15. The polymer film of claim 2, which is a multilayer film.

16. The polymer film of claim 1, which further comprises an additive selected from the group consisting of dyes, pigments, stabilizers, anti-oxidants, flame retardants, infrared absorbers, infrared blocking agents, ultraviolet absorbers, ultraviolet stabilizers, lubricants, dispersing agents, surfactants, chelating agents, coupling agents, binders, adhesion controlling agents, and combinations thereof.

17. The polymer film of claim 2, which further comprises an additive selected from the group consisting of dyes, pigments, stabilizers, anti-oxidants, flame retardants, infrared absorbers, infrared blocking agents, ultraviolet absorbers, ultraviolet stabilizers, lubricants, dispersing agents, surfactants, chelating agents, coupling agents, binders, adhesion controlling agents, and combinations thereof.

18. A laminated glass, which comprises a first glass sheet, a second glass sheet, and the polymer film of claim 1 disposed between the first glass sheet and the second glass sheet.

19. A laminated glass, which comprises a first glass sheet, a second glass sheet, and the polymer film of claim 2 disposed between the first glass sheet and the second glass sheet.

* * * * *